US010875135B2

(12) United States Patent
Smith

(10) Patent No.: US 10,875,135 B2
(45) Date of Patent: Dec. 29, 2020

(54) JIG FOR FIREARM LOWER RECEIVER MANUFACTURE

(71) Applicant: 80 Percent Arms Inc., Garden Grove, CA (US)

(72) Inventor: Tilden Alan Smith, Westminster, CA (US)

(73) Assignee: 80 Percent Arms Inc., Garden Grove, CA (US)

( * ) Notice: Subject to any disclaimer, the term of this patent is extended or adjusted under 35 U.S.C. 154(b) by 73 days.

(21) Appl. No.: 16/116,266

(22) Filed: Aug. 29, 2018

(65) Prior Publication Data

US 2019/0210170 A1     Jul. 11, 2019

Related U.S. Application Data

(63) Continuation of application No. 15/954,935, filed on Apr. 17, 2018, now Pat. No. 10,099,329.

(Continued)

(51) Int. Cl.
*B23Q 3/06* (2006.01)
*B23B 49/02* (2006.01)
(Continued)

(52) U.S. Cl.
CPC .............. *B23Q 3/062* (2013.01); *B23B 47/28* (2013.01); *B23B 49/023* (2013.01); *B23C 9/00* (2013.01);
(Continued)

(58) Field of Classification Search
CPC . B23Q 3/062; B23Q 3/00; B23Q 3/04; B23Q 3/06; B23Q 3/067; B23Q 3/154
See application file for complete search history.

(56) References Cited

U.S. PATENT DOCUMENTS

| 362,044 A | 4/1887 | Strange |
|---|---|---|
| 1,476,019 A | 12/1923 | William |

(Continued)

FOREIGN PATENT DOCUMENTS

| CA | 1137338 A | 12/1982 |
|---|---|---|
| EP | 0055307 A1 | 7/1982 |
| FR | 1075194 A | 10/1954 |
| GB | 1008029 A | 10/1965 |

OTHER PUBLICATIONS

80 Percent Arms Inc., "Easy Jig® Gen 2 Multi-Platform Milling System User Manual" dated 2017, 15 pages.

(Continued)

*Primary Examiner* — Lee D Wilson
(74) *Attorney, Agent, or Firm* — Knobbe Martens Olson & Bear LLP

(57) ABSTRACT

A machining tool assembly is provided for machining a blank to form a firearm lower receiver. The assembly includes a pair of side plates positionable on opposed sides of the blank to capture the blank therebetween. A template plate having a template aperture is adapted to be removeably attachable to the side plates. The template aperture is aligned with a top surface of the blank and is adapted for machining a cavity within the blank having a peripheral contour complimentary to a peripheral contour of the template aperture. A centering mechanism is adapted to be removeably attachable to the template plate, with the centering mechanism including an opening aligned with a corresponding void formed on the blank to align the blank with the template plate.

20 Claims, 9 Drawing Sheets

Related U.S. Application Data

(60) Provisional application No. 62/486,898, filed on Apr. 18, 2017.

(51) Int. Cl.
*B23B 47/28* (2006.01)
*B23C 9/00* (2006.01)
*B23B 51/00* (2006.01)
*B23C 3/00* (2006.01)

(52) U.S. Cl.
CPC ....... *B23B 51/0054* (2013.01); *B23B 2215/28* (2013.01); *B23B 2247/12* (2013.01); *B23C 3/00* (2013.01); *B23C 2255/00* (2013.01); *B23Q 2703/10* (2013.01)

(56) References Cited

U.S. PATENT DOCUMENTS

| | | | |
|---|---|---|---|
| 2,273,954 A | 2/1942 | Grass | |
| 2,363,085 A | 11/1944 | Roye | |
| 2,393,424 A | 1/1946 | Selch | |
| 2,455,644 A | 12/1948 | Barnes | |
| 2,482,535 A | 9/1949 | Bayless | |
| D160,734 S | 10/1950 | Polkosnik | |
| 2,538,173 A | 1/1951 | Swebilius | |
| 2,543,917 A | 3/1951 | Lloyd | |
| 2,601,809 A | 7/1952 | Di Nardo | |
| 2,859,645 A | 11/1958 | Emmons et al. | |
| 2,896,677 A | 7/1959 | Payzant | |
| 3,108,500 A | 10/1963 | Merriman | |
| 3,141,509 A | 7/1964 | Bent | |
| 3,149,534 A | 9/1964 | Stephens | |
| 3,358,375 A | 12/1967 | Lutz | |
| 3,396,613 A | 8/1968 | Hutton | |
| 3,494,229 A | 2/1970 | Judge | |
| 3,555,964 A | 1/1971 | Fleming | |
| 3,785,634 A | 1/1974 | Denker | |
| 3,788,632 A * | 1/1974 | Lukas | B23Q 16/04 269/20 |
| 3,789,892 A | 2/1974 | Converse et al. | |
| 3,799,687 A | 3/1974 | Anderson | |
| 3,811,163 A | 5/1974 | Frederick et al. | |
| 3,984,192 A | 10/1976 | Wanner et al. | |
| 4,145,160 A | 3/1979 | Wiggins | |
| 4,155,383 A | 5/1979 | Welliver | |
| 4,209,275 A | 6/1980 | Kim | |
| 4,330,229 A | 5/1982 | Croydon | |
| 4,448,406 A | 5/1984 | Hallberg | |
| 4,475,437 A | 10/1984 | Sullivan | |
| 4,484,608 A | 11/1984 | Ferdinand | |
| 4,502,367 A | 3/1985 | Sullivan | |
| 4,505,182 A | 3/1985 | Sullivan | |
| 4,536,107 A | 8/1985 | Sandy et al. | |
| 4,610,581 A | 9/1986 | Heinlein | |
| 4,630,656 A | 12/1986 | Collins | |
| 4,648,761 A | 3/1987 | Mitchell et al. | |
| D291,529 S | 8/1987 | Degen | |
| 4,735,007 A | 4/1988 | Gal | |
| 4,738,574 A | 4/1988 | Emmert | |
| 4,813,125 A | 3/1989 | Dacey, Jr. | |
| 4,859,824 A | 8/1989 | Ukaji | |
| 4,936,721 A | 6/1990 | Meyer | |
| 4,948,306 A | 8/1990 | Wiedner et al. | |
| 4,966,507 A | 10/1990 | Hanks | |
| 5,017,056 A | 5/1991 | Morash | |
| 5,059,059 A | 10/1991 | Cox | |
| 5,102,271 A | 4/1992 | Hemmings | |
| 5,123,463 A * | 6/1992 | Grisley | B23Q 35/20 144/144.1 |
| 5,141,369 A | 8/1992 | Palace | |
| 5,165,827 A | 11/1992 | Miller | |
| 5,209,614 A * | 5/1993 | Matthews | B23Q 1/28 408/1 R |
| 5,311,654 A | 5/1994 | Cook | |
| 5,358,364 A | 10/1994 | Kall | |
| 5,378,091 A | 1/1995 | Nakamura | |
| 5,492,160 A | 2/1996 | McCracken | |
| 5,560,408 A | 10/1996 | DiFranco | |
| 5,694,994 A | 12/1997 | Engler, III | |
| 5,725,038 A | 3/1998 | Tucker | |
| 5,967,712 A | 10/1999 | Magill et al. | |
| 6,065,909 A | 5/2000 | Cook | |
| 6,070,352 A | 6/2000 | Daigle | |
| 6,158,487 A | 12/2000 | Licari | |
| 6,394,466 B1 | 5/2002 | Matsumoto et al. | |
| 6,481,937 B1 | 11/2002 | Sommerfeld et al. | |
| 6,520,224 B2 | 2/2003 | Smith | |
| 6,557,730 B1 | 5/2003 | Kaye | |
| 6,742,558 B1 | 6/2004 | Witt | |
| 6,792,711 B2 | 9/2004 | Battaglia | |
| 6,796,050 B2 | 9/2004 | Haimer et al. | |
| 6,813,843 B1 | 11/2004 | Faubion | |
| D528,930 S | 9/2006 | Degen | |
| 7,108,463 B2 | 9/2006 | Hummel | |
| 7,225,539 B2 | 6/2007 | Nowak et al. | |
| 7,231,861 B1 | 6/2007 | Gauny et al. | |
| 7,269,901 B2 | 9/2007 | Robin | |
| 7,367,763 B2 | 5/2008 | Ruy Frota de Souza | |
| D571,233 S | 6/2008 | Rys, Jr. | |
| 7,588,400 B2 | 9/2009 | Taylor | |
| 7,641,425 B2 | 1/2010 | Sommerfeld et al. | |
| 7,871,224 B2 | 1/2011 | Dost et al. | |
| 8,052,355 B2 | 11/2011 | Hirukawa et al. | |
| 8,241,297 B2 | 8/2012 | Ashman | |
| 8,327,749 B2 | 12/2012 | Underwood | |
| 8,573,906 B2 | 11/2013 | Gowker | |
| 8,584,372 B2 | 11/2013 | Stoffel | |
| 8,656,622 B2 | 2/2014 | Peterson et al. | |
| 8,683,725 B2 | 4/2014 | Munson | |
| 9,009,986 B1 | 4/2015 | Chang et al. | |
| 9,259,851 B2 | 2/2016 | Cardew | |
| 9,662,717 B2 | 5/2017 | Prom et al. | |
| 9,802,332 B2 | 10/2017 | Davey | |
| 9,810,517 B2 | 11/2017 | Chang et al. | |
| D804,926 S | 12/2017 | Atkinson | |
| 9,982,958 B1 | 5/2018 | Partington | |
| D824,741 S | 8/2018 | Davis | |
| 10,099,329 B1 * | 10/2018 | Smith | B23Q 3/062 |
| 10,145,633 B1 | 12/2018 | Partington | |
| D847,935 S | 5/2019 | Smith | |
| 10,391,591 B2 | 8/2019 | Smith | |
| 10,456,846 B1 | 10/2019 | Partington | |
| 10,718,578 B2 | 7/2020 | Partington | |
| 2001/0011564 A1 | 8/2001 | Darling | |
| 2002/0021945 A1 | 2/2002 | Harpaz et al. | |
| 2004/0065387 A1 | 4/2004 | Smith | |
| 2004/0179906 A1 | 9/2004 | Hughes et al. | |
| 2005/0025588 A1 | 2/2005 | Effrem | |
| 2005/0086788 A1 | 4/2005 | Wasileski et al. | |
| 2005/0120573 A1 | 6/2005 | Port | |
| 2010/0074701 A1 | 3/2010 | Kempen et al. | |
| 2010/0303568 A1 | 12/2010 | York | |
| 2011/0280676 A1 | 11/2011 | Nordlin | |
| 2012/0005937 A1 | 1/2012 | Milino | |
| 2013/0028675 A1 | 1/2013 | Vogler et al. | |
| 2015/0027587 A1 | 1/2015 | Smith | |
| 2015/0040414 A1 | 2/2015 | Nakamura et al. | |
| 2015/0128396 A1 | 5/2015 | Motomura | |
| 2017/0209941 A1 | 7/2017 | Chang et al. | |
| 2018/0058835 A1 | 3/2018 | Chang et al. | |
| 2018/0297160 A1* | 10/2018 | Smith | B23B 47/28 |
| 2019/0210170 A1* | 7/2019 | Smith | B23C 9/00 |
| 2020/0206832 A1 | 7/2020 | Smith | |

OTHER PUBLICATIONS

80 Percent Arms Inc., "AR-15 Easy Jig® Manual," dated 2016, 20 pages.

5D Tactical LLC, A New Dimension in Firearms, "AR-15 & AR-308 Router Jig Instructions," dated as created Dec. 14, 2016 (as indicated by the PDF file metadata), 11 pages.

(56) References Cited

OTHER PUBLICATIONS

Modulus Arms, "Universal AR-15 80% Lower Receiver Jig Instructions," dated Mar. 25, 2015, 19 pages.
Modulus Arms, "AR-308/AR-10 Jig Instructions," dated Oct. 20, 2014, 24 pages.
Usmcdoc14, "More how to and tips for milling an 80% AR lower . . . without a mill!" <https://www.youtube.com/watch?v=tJzwylo4Sx8>, as published on Feb. 4, 2013.
Kreg Tool, Quick-Start Guide, Jig Product Manual, dated 2010, 27 pages.
Kreg Newsletter, "4 Tips for Tight-Fitting Kreg Joints," available at <http://www.kregtool.com/files/newsletters/kregplus/may13.html>, dated Aug. 2013, 4 pages.
DIYdiva, "Joinery 101: Using a Kreg Jig," available at <http://diydiva.net/2011/07/joinery-101-using-a-kreg-jig/>, dated on Jul. 18, 2011.
Modulus Arms, "Heavy-Duty Universal AR-15 80% Lower Receiver Jig Instructions," dated Jan. 14, 2016, 21 pages.
Iconic Industries Inc., "Legacy Instructions for Iconic Brand Jigs," <https://www.iconicindustriesinc.com/finishing-fixturesjigs>, for purposes of examination, consider published before Apr. 18, 2017, pp. 3-25.

\* cited by examiner

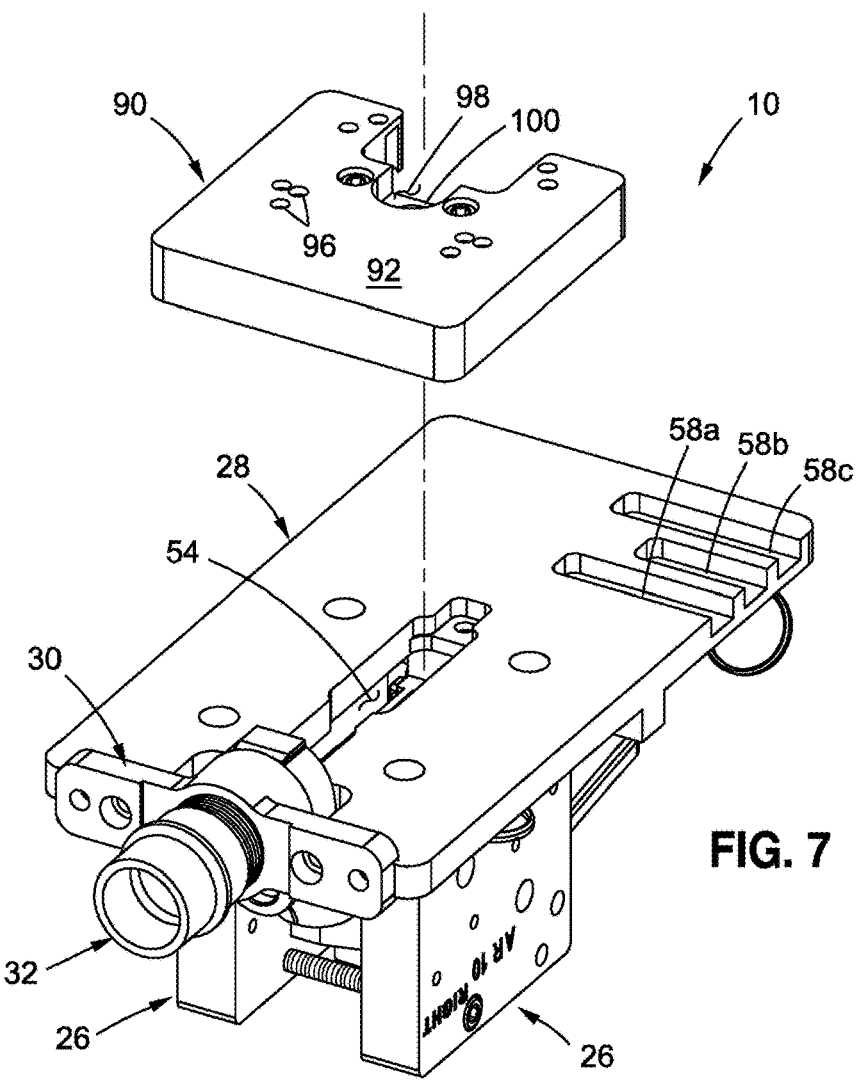
FIG. 7
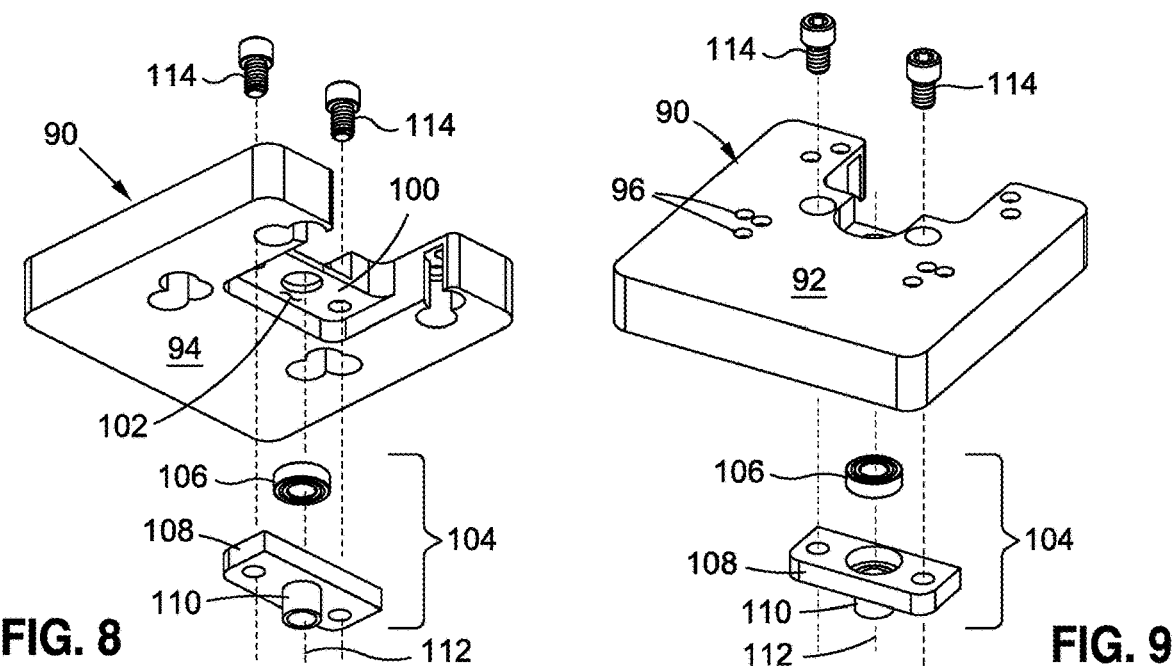
FIG. 8
FIG. 9

JIG FOR FIREARM LOWER RECEIVER MANUFACTURE

PRIORITY

This application is a continuation of U.S. patent application Ser. No. 15/954,935, filed Apr. 17, 2018, which application claims the benefit of U.S. Provisional Patent Application No. 62/486,898, filed Apr. 18, 2017, the entirety of which are incorporated herein by reference.

Any and all applications for which a foreign or domestic priority claim is identified in the Application Data Sheet as filed with the present application are hereby incorporated by reference under 37 CFR 1.57.

BACKGROUND

Field

The present disclosure relates generally to machining portions of a firearm, and more specifically, to an adaptable machining tool assembly for machining a firearm lower receiver from a blank.

Related Art

Firearms are widely used, and among the most common firearms are the AR-15 and AR-10 semi-automatic rifles. Such firearms are comprised of several different components, which generally include a lower receiver, an upper receiver, a stock and a barrel. Although several components are included in the firearm, it is typically only the lower receiver that is technically classified as a firearm and the subject of regulation. In this regard, while most components of a firearm may be readily acquired, the regulations governing firearms tend to make it much more difficult to acquire a lower receiver.

In view of the regulations controlling access to lower receivers, there is a market for partially manufactured lower receivers, referred to herein as "blanks," which are not subjected to the regulations covering completed lower receivers. Such partially manufactured lower receiver are approximately eighty percent complete, and are sold to consumers, who then complete the final twenty percent of the manufacturing. Indeed, such blanks are sold by 80 Percent Arms Inc. located in Santa Ana, Calif., and the assignee of the present patent application.

Understanding that most consumers are not professional machinists, several kits or jigs have been made available to allow consumers of lower receiver blanks to more easily complete the final twenty percent of the manufacturing process to form the completed lower receiver. The jigs typically are configured to hold the lower receiver blank in place, and to provide one or more cutting templates for machining out the various structures needed to form the completed lower receiver.

Although conventional jigs are helpful in completing the machining processes required for transforming the lower receiver blank into a completed lower receiver, such conventional jigs also suffer from various deficiencies. For instance, most jigs are configured for use with one particular type of lower receiver blank. As such, if a consumer purchases an AR-10 blank and an AR-15 blank, the consumer would likely need two separate jigs to machine the different blanks. Furthermore, in most instances, it is critical to properly align the blanks with the corresponding jig to ensure the machining process is performed at the correct locations on the blank. Improper alignment may result in the blank being destroyed by the machining process.

Accordingly, there is a need in the art for an improved assembly for machining a lower receiver blank. Various aspects of the present disclosure address this particular need, as will be discussed in more detail below.

SUMMARY

In accordance with one embodiment of the present disclosure, there is provided a machining tool assembly that allows a user to quickly and easily machine different lower receiver blanks of differing platforms, sizes, and calibers using the same machining tool assembly. In this regard, a user is not required to invest in multiple machining tool assemblies for machining different lower receivers.

According to one embodiment, there is provided a machining tool assembly for machining portions of a blank to form a firearm lower receiver, with the blank having a top surface and a buffer tube. The machining tool assembly includes a pair of side plates adapted to be positioned on opposed sides of the blank to capture the blank therebetween. A template plate is adapted to be removeably attachable to the pair of side plates, with the template plate including a template aperture formed therein and including regions of varying width. The template aperture is aligned with the top surface of the blank when the blank is captured between the pair of side plates and the template plate is secured to the pair of side plates. The template aperture is adapted for machining a cavity within the blank having a peripheral contour complimentary to a peripheral contour of the template aperture. A centering mechanism is adapted to be removeably attachable to the template plate, the centering mechanism including an opening aligned with a corresponding void formed on the blank to align the blank with the template plate.

The machining tool assembly may include a guide insert having a pilot forming aperture formed therein. The guide insert may be removeably attachable to the template plate to align the pilot forming aperture with the template aperture. The guide insert may include a trigger slot forming aperture formed therein, with the guide insert being removably attachable to the template plate to align the trigger slot forming aperture with the template aperture.

The machining tool assembly may include an alignment insert configured to be insertable through the opening in the centering mechanism and the void in the blank to align the blank with the template plate. The alignment insert may be a buffer screw having external threads adapted to engage internal thread formed on the buffer opening.

The machining tool assembly may additionally comprise a bushing adapted disposed about a bushing axis, with the bushing being adapted to receive a router bit along the bushing axis, and the bushing further being adapted to be received within the template aperture. The machining tool assembly may also include a router plate attachable to the bushing and attachable to the router, with the router plate being adapted to be moveable over an outer surface of the template plate.

Each side plate may include a plurality of apertures formed therein, with the plurality of apertures extending between opposed faces of the corresponding side plate. The plurality of apertures may include a first set of apertures adapted for use with a first blank and a second set of apertures adapted for use with a second blank, wherein the second blank may be associated with a different caliber or size than that of the first blank.

The template plate may include at least one depth gauge formed therein, with the at least one depth gauge comprising at least one groove formed in the template plate.

The template plate may include a side wall and a recess extending into template plate from the side wall toward aperture, with the recess being configured to receive buffer tube.

According to another embodiment, there is provided a machining tool assembly comprising a pair of side plates adapted to be positioned on opposed sides of the blank to capture the blank therebetween, with each side plate having a first set of apertures associated with a first firearm lower receiver and a second set of apertures associated with a second firearm lower receiver that is of a different caliber, size, or platform. A template plate is adapted to be removeably attachable to the pair of side plates. The template plate includes a template aperture formed therein. The template aperture is aligned with the top surface of the blank when the blank is captured between the pair of side plates and the template plate is secured to the pair of side plates. The template aperture is adapted for machining a cavity within the blank having a peripheral contour complimentary to a peripheral contour of the template aperture. Each of the pair of side plates is selectively transitional relative to the template plate between a first orientation and a second orientation to selectively align one of the first set of apertures and the second set of apertures with the blank. Each side plate rotates at least ninety degrees relative to the template plate as the corresponding side plate transitions between the first orientation and the second orientation.

Each side plate may rotate 180 degrees between the first orientation and the second orientation. The 180 degree rotation of each side plate may be about one of a first axis and a second axis substantially perpendicular to the first axis.

The present disclosure will be best understood by reference to the following detailed description when read in conjunction with the accompanying drawings.

BRIEF DESCRIPTION

These and other features and advantages of the various embodiments disclosed herein will be better understood with respect to the following description and drawings, in which:

FIG. 7 is an upper perspective, partial exploded view of the machining tool assembly in a third configuration;

FIG. 8 is a lower perspective view of a router attachment sub-assembly used in the third configuration;

FIG. 9 is an upper perspective view of the router attachment sub-assembly used in the third configuration;

Common reference numerals are used throughout the drawings and the detailed description to indicate the same elements.

DETAILED DESCRIPTION

The detailed description set forth below in connection with the appended drawings is intended as a description of certain embodiments of a machining tool assembly for a firearm lower receiver and is not intended to represent the only forms that may be developed or utilized. The description sets forth the various structure(s) and/or functions in connection with the illustrated embodiments, but it is to be understood, however, that the same or equivalent structure and/or functions may be accomplished by different embodiments that are also intended to be encompassed within the scope of the present disclosure. It is further understood that the use of relational terms such as first and second, and the like are used solely to distinguish one entity from another without necessarily requiring or implying any actual such relationship or order between such entities.

Figure 12:
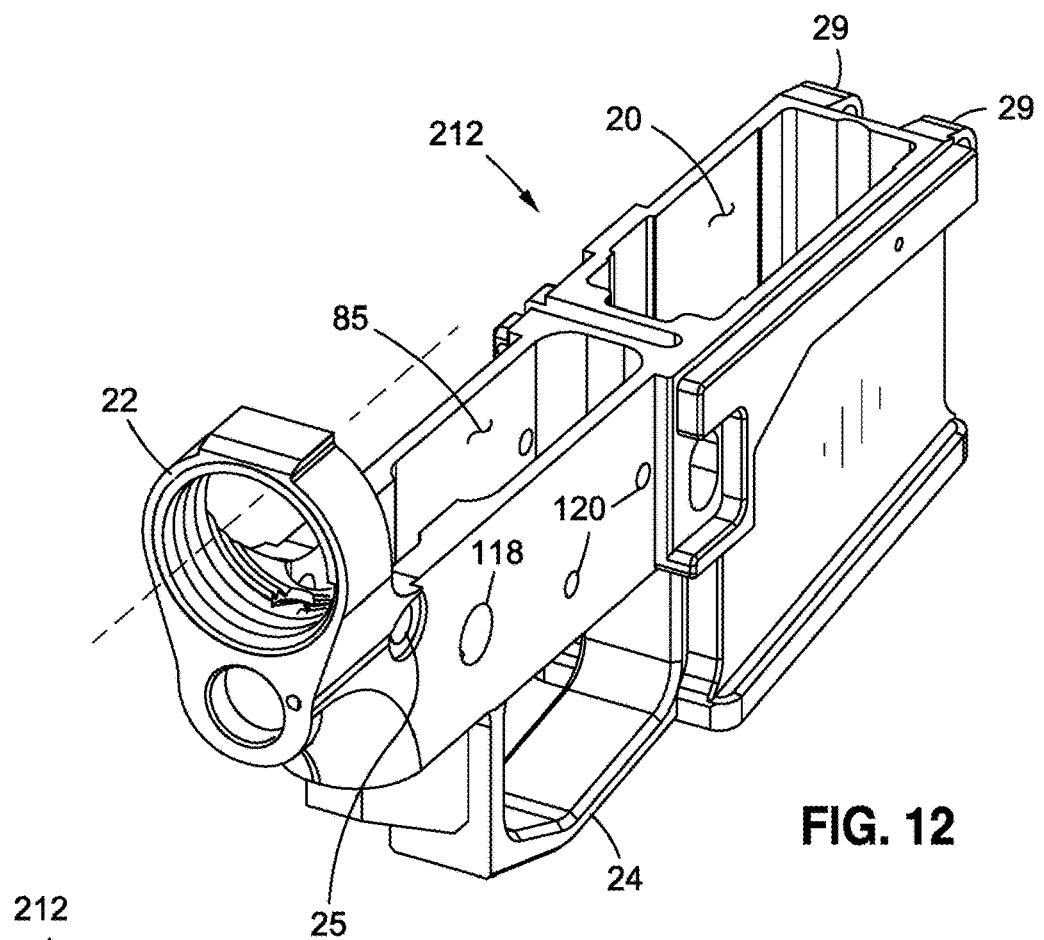
FIG. 12 is an upper perspective view of a completed lower receiver.
Figure 13:
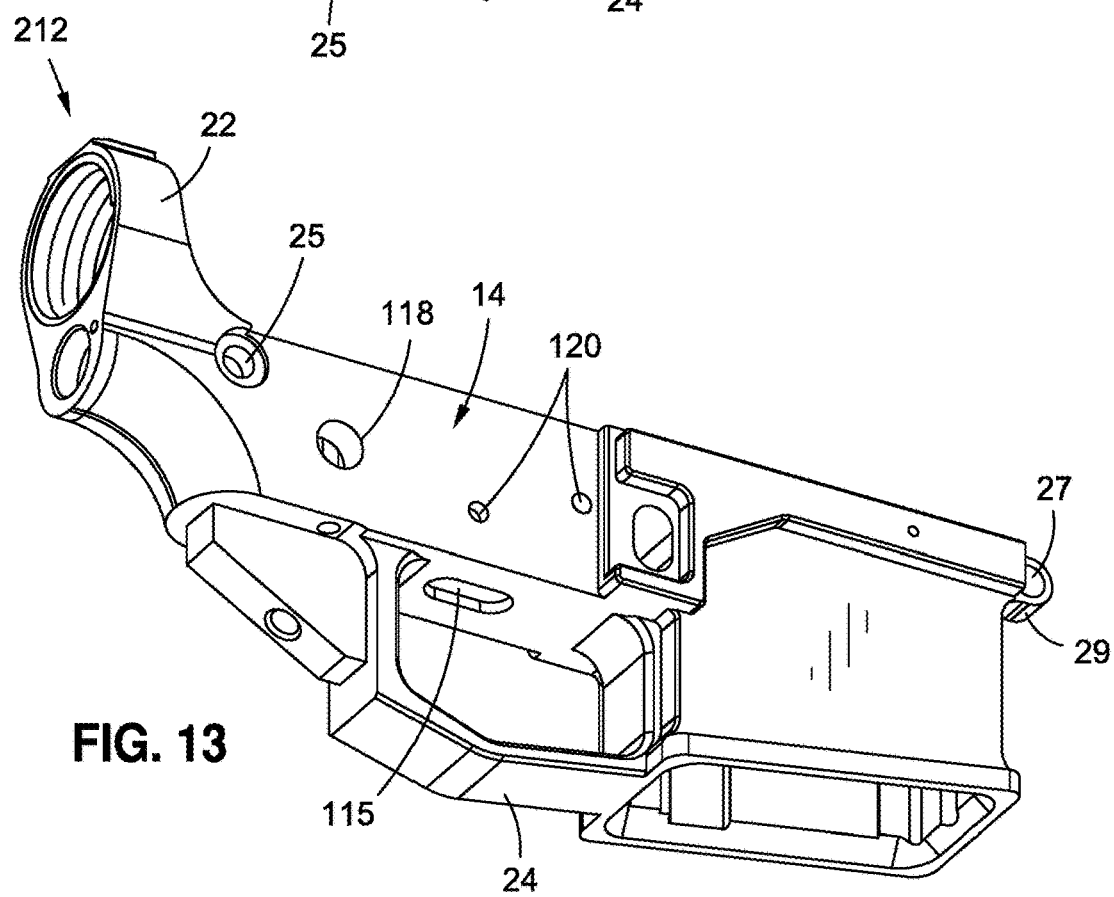
FIG. 13 is a lower perspective view of the completed lower receiver depicted in FIG. 12.

Referring now to the drawings, wherein the showings are for illustrating preferred embodiments of the present disclosure, and are not for purposes of limiting the same, there is depicted a machining tool assembly 10, i.e., a jig, specifically configured and adapted for machining portions of a blank 12 to form a finished firearm lower receiver, such as a lower receiver for an AR-10 or an AR-15 firearm, or other firearms known in the art. In this regard, the "blank" 12 which is used with the machining tool assembly 10 has already been pre-manufactured to include several structural attributes of the finished firearm lower receiver. In some instances, the blank 12 is approximately eighty percent complete, with the remaining twenty percent being completed by the purchaser of the blank 12. As such, the machining tool assembly 10 is specifically configured and adapted to allow a user to easily complete the process of machining the blank 12 to form all of the structural features of the firearm lower receiver. An example of a completed lower receiver 212 is depicted in FIGS. 12 and 13. It is understood that the machining tool assembly 10 is not limited to use for machining blanks 12 for one particular firearm. Rather, the machining tool assembly 10 is adaptable for use with at least two different types of blanks 12 (e.g., blanks for an AR-10/.308 and blanks for an AR-15), thereby making the machining tool assembly 10 more universal in nature.

Referring now specifically to FIGS. 1-4, there is shown a first embodiment of the machining tool assembly 10 in a first configuration along with the blank 12 in its original configuration prior to any machining by the user. In this regard, it is understood that throughout the process of machining the blank 12 from its original configuration to its finished configuration, the machining tool assembly 10 will assume several different configurations, including substitution of various components to form various structural features on the blank 12.

According to one implementation, the blank 12 includes a central body 14 having a top surface 16 residing in a top plane 18. A magazine well 20 is connected to the central body 14 and an internally threaded buffer tube 22 is connected to an opposed end of the central body 14. A trigger guard 24 is additionally connected to the central body 14 opposite the top surface 16. Although the exemplary embodiment depicts a trigger guard 24, one or more models of blanks 12 may be available without trigger guards 24. The blank 12 additionally includes a rear takedown aperture 25 and a forward takedown aperture 27 formed by a pair of opposed tabs 29, with the takedown apertures 25, 27 being used to mount the blank 12 to the machining tool assembly 10.

The machining tool assembly 10 includes a pair of side plates 26, a template plate 28, a centering mechanism 30, and an alignment insert 32. Each side plate 26 includes a pair of opposing side faces 34 and a plurality of apertures formed therein and extending between the opposing faces 34. Some of the apertures formed in the side plate 26 are used for mounting and aligning the side plates 26 on opposed sides of the blank 12, while other apertures are used as a guide for drilling the blank 12, as will be described in more detail below.

Each side plate 26 may include two regions 36, 38, wherein the apertures located in a first region 36 are associated with machining a blank 12 associated with a first firearm (e.g., an AR-10/.308), while the apertures located in the second region 38 are associated with machining a blank 12 associated with a second firearm (e.g., an AR-15). According to one embodiment, the first and second regions 36, 38 are separated by a midline 37, which is generally perpendicular to a pair of opposed edges of the corresponding side plate 26. The midline 37 may be denoted by a physical groove or other indicator on the side plate 26, or alternatively, may be an imaginary axis that separates the two regions 36, 38. Each region 36, 38 may include markings or other indicia formed thereon to identify the firearm associated with the drilling apertures located in that region 36, 38.

Each region 36, 38 includes a set of non-drilling apertures 40, as well as a set of drilling apertures 42. In the exemplary embodiment, each region 36, 38 includes three drilling apertures 42, which are used to drill three apertures in the central body 14 of the blank 12, as will be discussed in more detail below. As will be explained in more detail below, the side plates 26 are selectively transitional relative to the template plate 28 between a first orientation and a second orientation to selectively align the appropriate set of apertures that corresponds to the blank 12 that is being machined. In the exemplary embodiment, the side plates are flipped approximately 180 degrees relative to the template plate 28 to transition the side plates between the first and second orientations.

Figure 1:
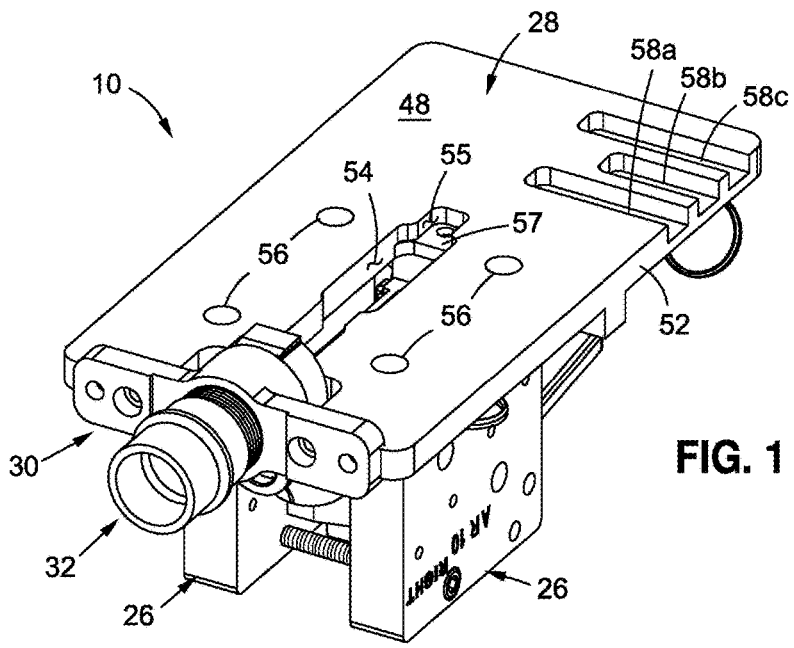
FIG. 1 is an upper perspective view of a first configuration of a machining tool assembly for use with a firearm lower receiver.
Figure 2:
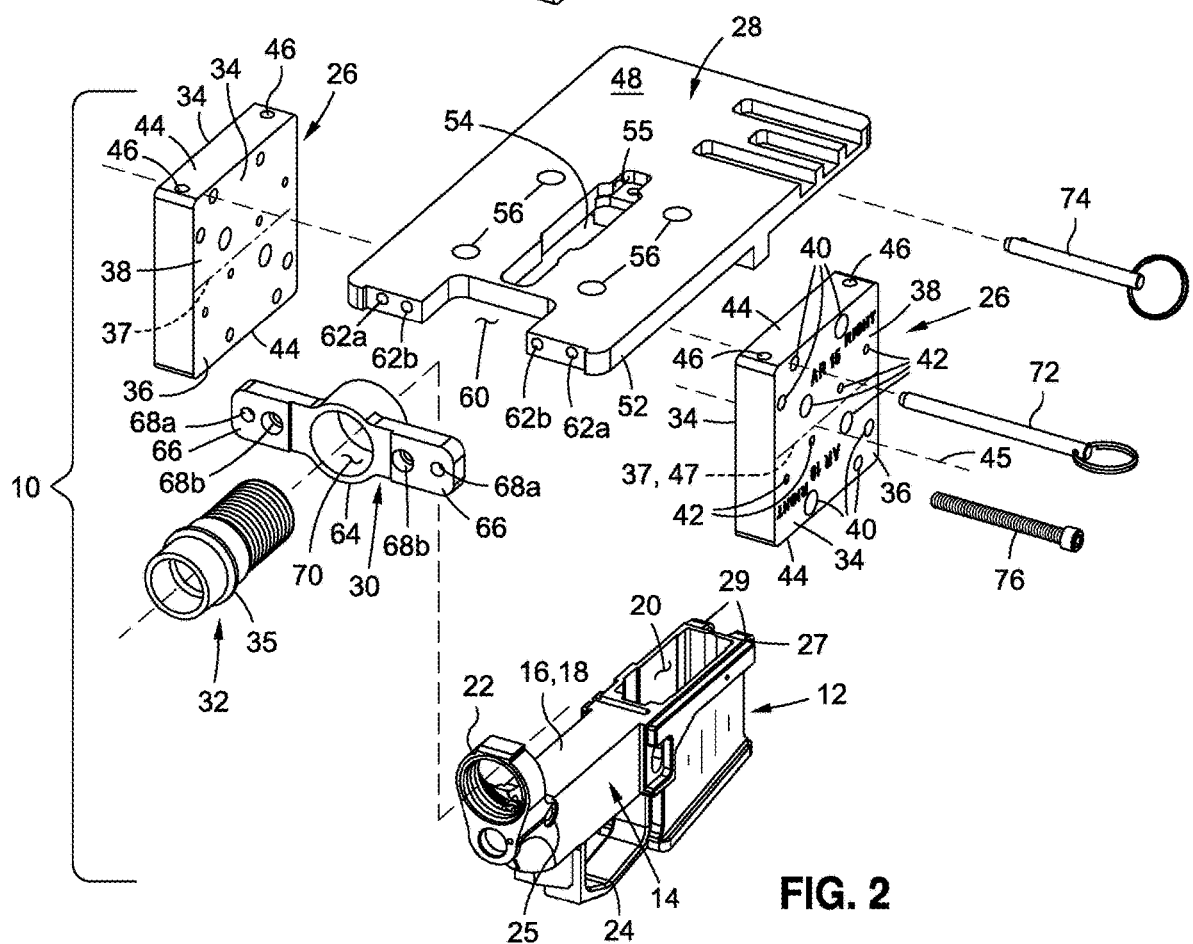
FIG. 2 is an exploded upper perspective view of the machining tool assembly in the first configuration depicted in FIG. 1.
Figure 2A:
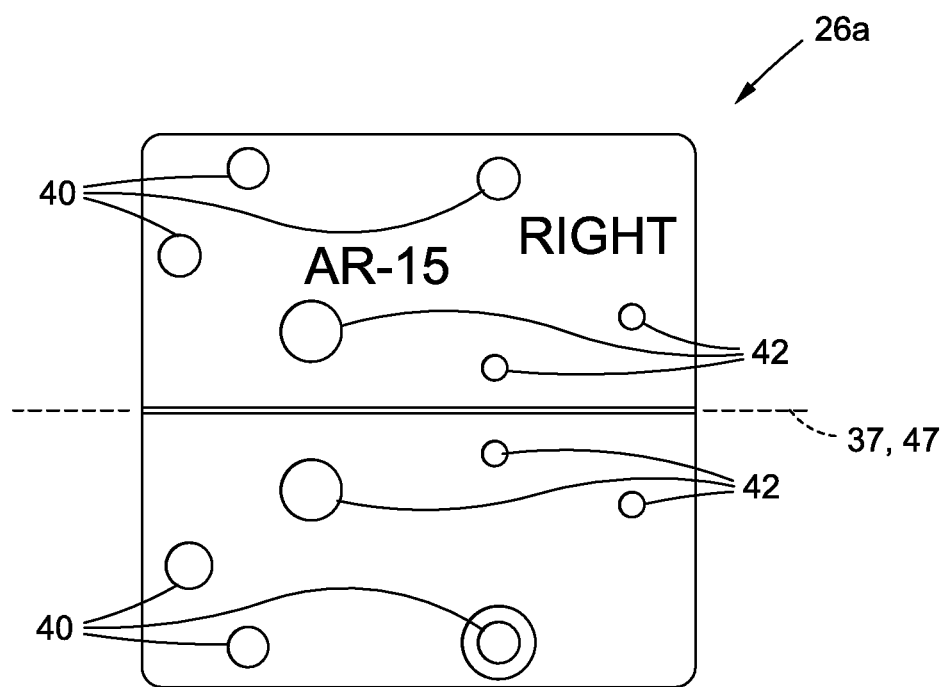
FIGS. 2A and 2B depict an alternative embodiment of the side plates adapted for transitional movement about a different axis from the side plates depicted in FIGS. 1 and 2.
Figure 2B:
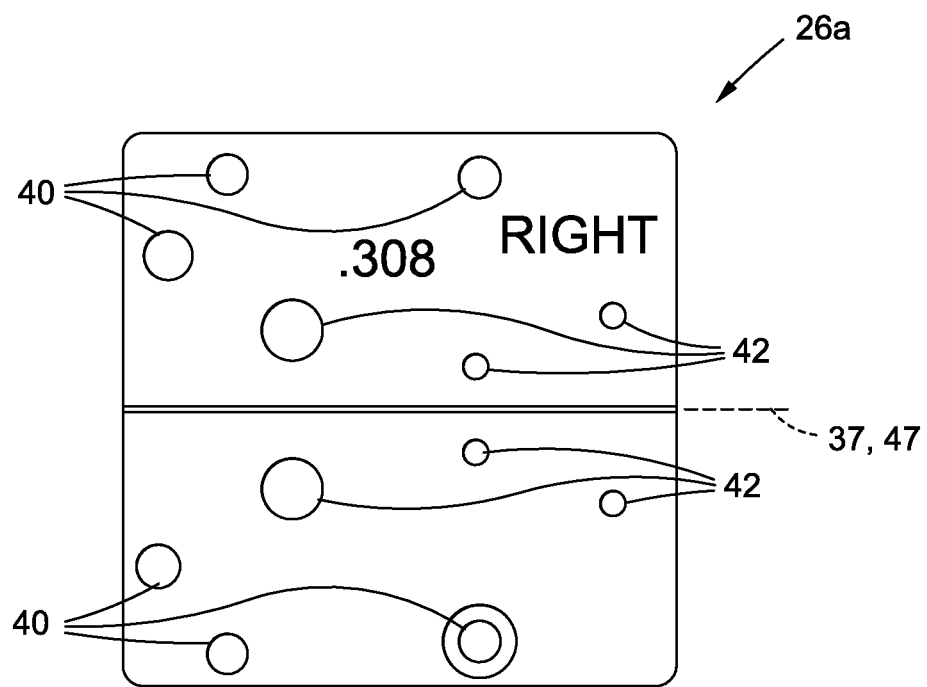

Each side plate 26 additionally includes a pair of opposed end faces 44, which extend generally parallel to the midline 37, and thus, typically form the top and bottom of the side plates 26 during use. Each end face 44 includes a pair of internally threaded bores 46 extending into the side plate 26 from the respective end face 44. The bores 46 are used to attach the side plates 26 to the template plate 28. In particular, the pair of bores 46 formed in a common end face 44 can be used to secure the side plate 26 to the template plate 28 with that end face 44 facing toward the template plate 28. In this regard, by forming a pair of bores in opposed end faces 44, each side plate 26 can be secured to the template plate 28 in several different orientations. In particular, a first orientation of the side plates 26 relative to the template plate 28 is shown in FIGS. 1 and 2. The side plates 26 can be transitioned from the first orientation to a second orientation by rotating each side plate 26 about an axis 45 extending generally perpendicular to the side faces 34 of the side plate 26. Alternatively, a second embodiment of the side plates is shown in FIGS. 2A and 2B, with the side plates 26 being configured to transition from the first orientation to the second orientation by rotating each side plate 26 about an axis 47 extending generally parallel to the midline 37, and perpendicular to axis 45.

The template plate 28 is removably attachable to the pair of side plates 26 and extends between the side plates 26 above the blank 12. It is contemplated that removable attachment of the template plate 28 to the side plates 26 may be effectuated via attachment of the side plates 26 to the template plate 28, or attachment of the side plates 26 to the template plate 28. The template plate 28 includes an upper surface 48, an opposing lower surface 50, and a sidewall 52 extending between the upper surface 48 and the lower surface 50. The template plate 28 additionally includes a template aperture 54 extending between the upper and lower surfaces 48, 50 along with four apertures 56 used for connecting the template plate 28 to the side plates 26. Along these lines, although the template plate 28 depicted in the figures includes four apertures 56 (i.e., two pairs) for connection to the pair of side plates 26, it is contemplated that as few as two apertures 56 may be used to connect the template plate 28 to the side plates 26 (i.e., one aperture 56 per side plate 26), or more than four apertures may be used to connect the template plate 28 to the side plates 26. The template aperture 54 defines a periphery having regions of varying width which corresponds to the periphery of the cavity that is to be machined into the top surface 16 of the central body 14. In the exemplary embodiment, template plate 28 is a single unit having the template aperture 54 cut directly therein. However, it is contemplated that the template plate 28 may include multiple components, including a base component having a larger opening which receives an insert having the template aperture 54 formed therein. Thus, a single base may be used with several different inserts. Furthermore, the four apertures 56 are arranged in two sets, with each set including a pair of apertures formed on a respective side of the template aperture 54. Each set of apertures 56 is aligned with a corresponding pair of bores 46 formed in the end faces 44 of the underlying side plates 26 to accommodate a mechanical fastener, such as a bolt, screw, or the like, to secure the template plate 28 to the side plates 26. In this regard, the template plate 28 is adapted to be removably attachable to the pair of side plates 26 through the use of the mechanical fastener. A template cavity 55 may extend from one end of the template aperture 55, with the template cavity 55 extending from the upper surface 48 and terminating at an intermediate surface 57. The purpose of the template cavity 55 will be explained in more detail below.

According to one embodiment, the template plate 28 may include at least one depth gauge formed therein. In the exemplary embodiment, the template plate 28 includes three depth gauges 58a-c in the form of grooves extending into the template plate 28 in one direction from the sidewall 52 and in another direction from the upper surface 48. The depth gauge(s) may be used to set the depth of the end mill during the machining process. Along these lines, the depth gauge(s) may include hash marks or other incremental markings to allow for incremental machining of the blank 12, as will be discussed in more detail below.

Figure 3:
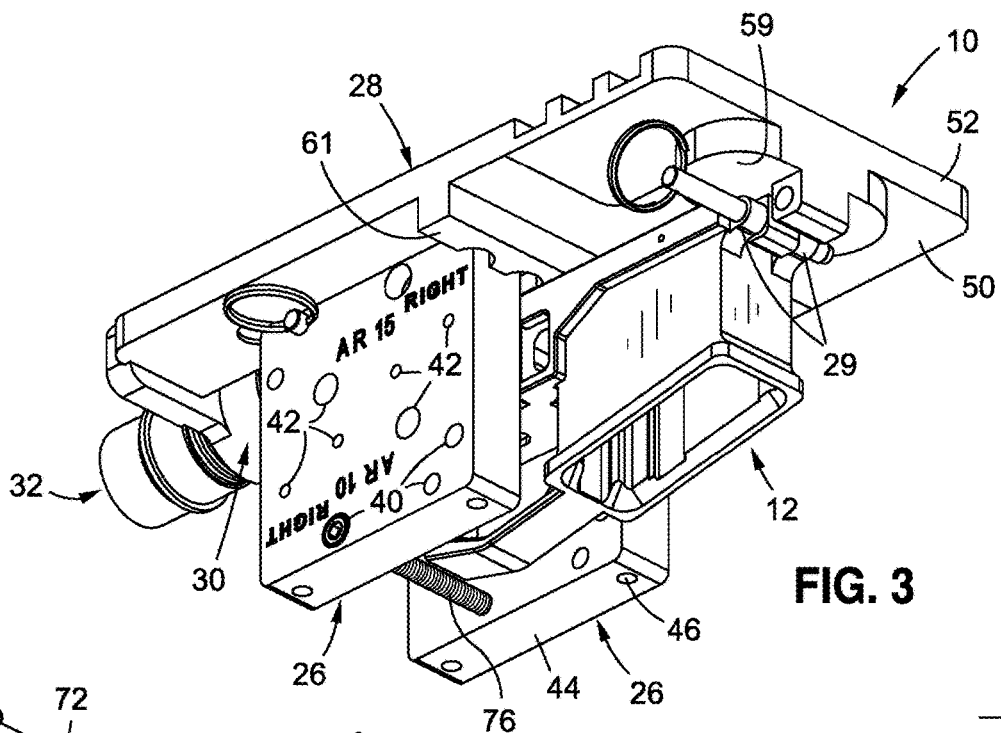
FIG. 3 is a lower perspective view of the machining tool assembly in the first configuration depicted in FIG. 1.
Figure 4:
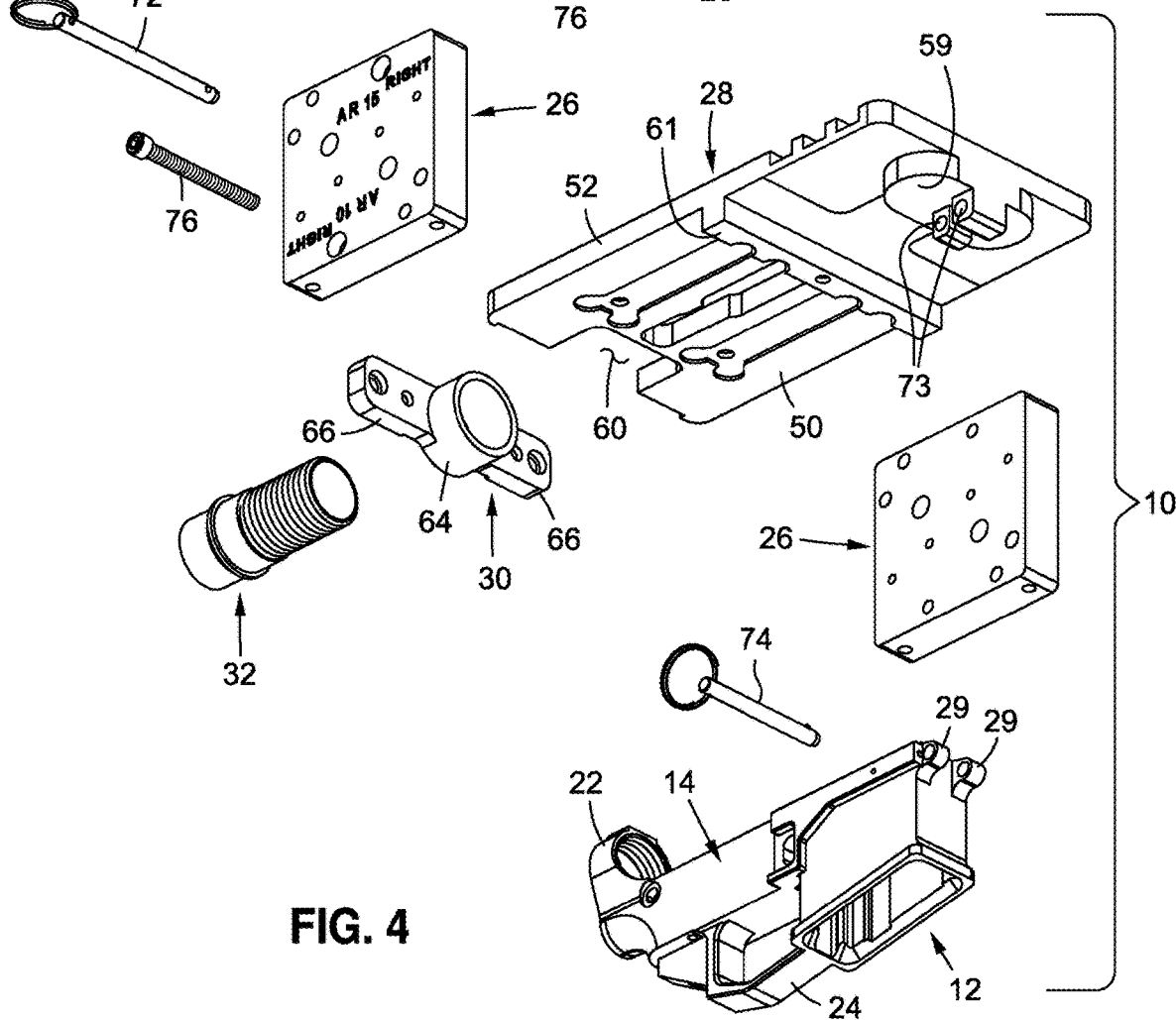
FIG. 4 is an exploded lower perspective view of the machining tool assembly in the first configuration depicted in FIG. 1.

Referring specifically to FIGS. 3 and 4, which show the template plate 28 from a lower perspective, the template plate 28 may include a front support platform 59 and a center support bar 61 extending from the lower surface 50. The front support platform 59 provides additional support to the blank 12 to prevent rotation of the blank 12 within the assembly 10 by having a surface of the blank 12 held against the support platform 59. Furthermore, the center support bar 61 provides additional support to the blank 12 to prevent rotation in the jig/assembly with a blank surface resting against the support bar 61. The support bar 61 also provides abutment for the side plates 26 to facilitate alignment of the support plates 26 relative to the template plate 28.

The template plate 28 additionally includes a recess 60 formed at one end thereof, with the recess 60 extending into template plate 28 from the side wall 52 toward the template aperture 54. The recess 60 is specifically configured and adapted to allow the buffer tube 22 of the blank 12 to extend therethrough when the blank 12 is connected to the template plate 28. The template plate side wall 52 may include two sets of threaded bores 62a, 62b, which are used to attaching the centering mechanism 30 to the template plate 28. Although the exemplary embodiment depicts two bores on either side of the recess 60, it is contemplated that in other embodiments, only one bore is formed in the template plate 28 on each side of the recess 60. Attachment of the centering mechanism 30 to the template plate 28 may be in one of two different orientations which are 180 degrees offset from each other. The different orientations of the centering mechanism 30 may be configured to accommodate two different blanks 12 having different sizes and/or dimensions.

The centering mechanism 30 includes a central cylinder 64 and two opposed tabs 66, with the pair of tabs 66 collectively defining two sets of apertures 68a, 68b that corresponding to the threaded bores 62a, 62b formed in the template plate 28. The central cylinder 64 defines including an opening 70 aligned with a corresponding void formed on the blank 12 to properly align the blank 12 with the template plate 28. In the exemplary embodiment, the opening 70 in the central cylinder 64 is aligned with the buffer tube opening to align the blank 12 with the template plate 28. The apertures in each tab 66 are aligned with the corresponding bores in the template plate 28 to accommodate a mechanical fastener for securing the centering mechanism 30 to the template plate 28. In this regard, the centering mechanism 30 is adapted to be removeably attachable to the template plate 28. In one embodiment, only one pair of mechanical fasteners may be used to secure the centering mechanism 30 to the template plate 28. Along these lines, the mechanical fasteners may be advanced through the apertures 68a and bores 62a when machining a first blank 12, while the mechanical fasteners may be advanced through apertures 68b and bores 62b when machining a second blank 12 of a different size and caliber.

Furthermore, the centering mechanism 30 may also be configured to adjust the position of the central cylinder 64 relative to the template plate 28 to accommodate different sized blanks 12. Along these lines, when the centering mechanism 30 is flipped, in addition to changing the elevation of the centering mechanism 30, it may also change the distance of the "wall" that abuts the blank 12. In particular, centering mechanism 30 creates a wall or boundary for the blank 12 in the aft section of the peripheral wall 52 of the template plate 28 which may be adjusted forward and aft by flipping the centering mechanism 30. For the AR-15 blank, the central cylinder 64 of the centering mechanism 30 extends into template plate 28 to take up the slack. For the .308 blank, the central cylinder 64 faces away from template plate 28 to accommodate the longer .308 blank.

A buffer screw 32, e.g., the alignment insert, is configured to be insertable through the opening 70 in the centering mechanism 30 and the buffer tube opening to align the blank 12 with the template plate 28. When the blank 12 is aligned with the template plate 28, the template aperture 54 resides directly above the top surface 16 of the central body 14. The buffer screw 32 includes external threads on at least a portion thereof, with the threads being adapted to engage internal thread formed on the buffer opening. The buffer screw 32 may also include a circumferential collar 35 which may serve as an engagement mechanism for connecting a vacuum to the buffer screw 32 for vacuuming chips when milling.

With the basic structure of the machining tool assembly 10 shown in FIGS. 1-4 described above, the following will discuss an exemplary method of use. The side plates 26 are secured to the template plate 28, with the side plates 26 being arranged relative to the template plate 28 with the indicia associated with the corresponding blank 12 being on top (i.e., adjacent the template plate 28). In this regard, if the blank 12 is an AR-15 blank, the side plates 26 are arranged with "AR-15" indicia on top and the "AR-10" on the bottom (i.e., away from the template plate 28). The centering mechanism 30 is also attached to the template plate 28 so as to extend across the recess 60 formed in the template plate 28. The centering mechanism 30 also matches the orientation of the side plates 26 for AR-15 or AR-10 configuration.

A blank 12 is then connected to the side walls 26 and template plate 28 by aligning apertures formed on the blank 12 with corresponding apertures formed on the side plates 26 and template plate 28. A rear pin 72 is advanced through a rearwardly positioned set of aligned side plate apertures 40 and the rear takedown pin support 25 and a forward pin 74 is advanced through a forwardly positioned aperture 73 formed on the template plate 28 and the forward takedown pin support 27 on the blank 12. As shown in FIG. 4, the template plate 28 may include a pair of forwardly positioned apertures 73, with one of the apertures 73 being configured for use with the AR-15 blank, and the other aperture 73 being configured for use with an AR-10/.308 blank. Furthermore, the buffer screw 32 is advanced through the center cylinder 64 and is threadingly engaged with the buffer tube 22, with the buffer screw 32 being hand tightened into the buffer tube 22.

A bolt 76 may be threaded through the bottom of both side plates 26 to prevent deformation of the side plates 26 during use. Along these lines, the assembly 10 is preferably placed in a vice, and the bolt 76 may prevent deformation when the assembly 10 is tightened in the vice.

Figure 5:
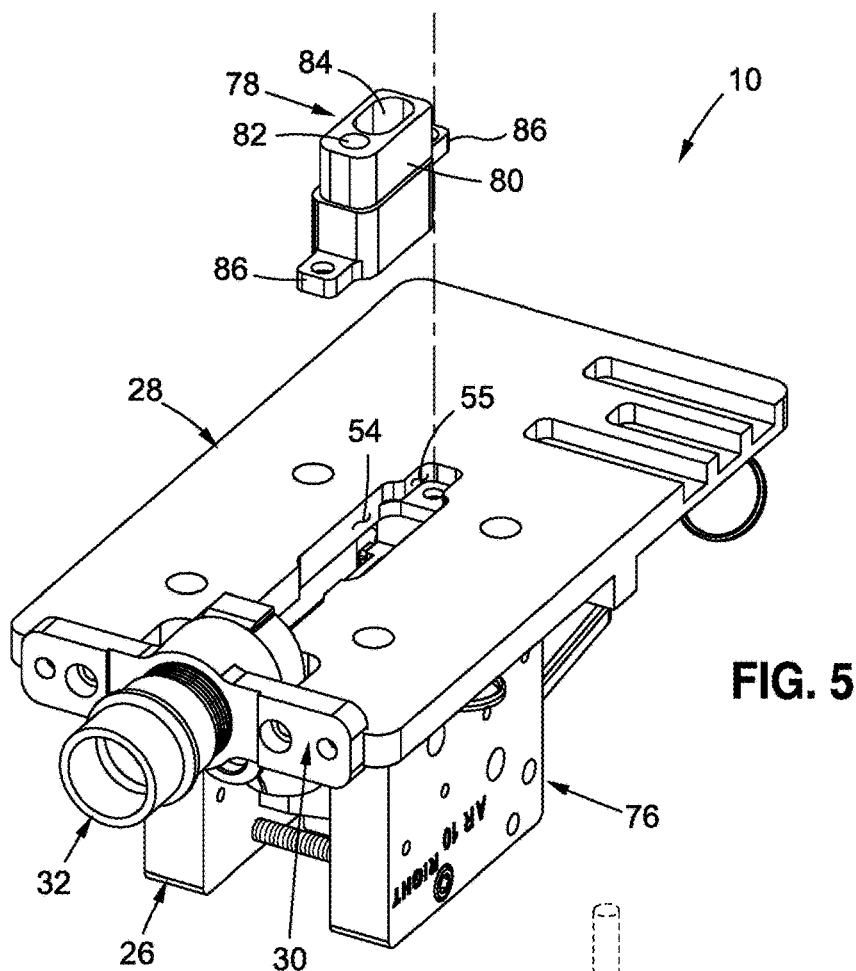
FIG. 5 is a partially exploded upper perspective view of the machining tool assembly in a second configuration.
Figure 6:
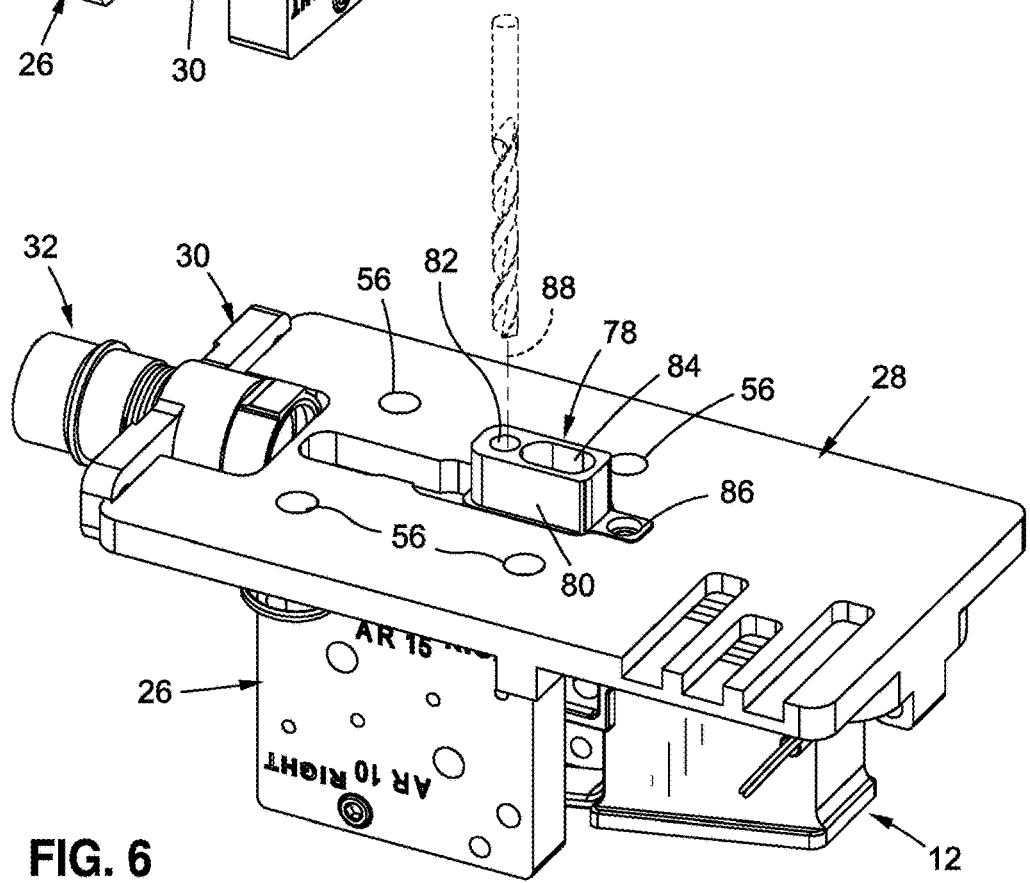
FIG. 6 is an upper perspective view of the machining tool assembly in the second configuration, with a drill bit used for drilling the firearm lower receiver pilot hole depicted in phantom.

The configuration of the assembly 10 depicted in FIGS. 1 and 3 is considered a first configuration, wherein the blank 12 is secured and properly aligned with the assembly 10. FIGS. 5 and 6 depict a second configuration of the assembly 10, which includes a guide insert 78. The embodiment of the guide insert 78 shown in the drawings serves two purposes: 1) the guide insert 78 is initially used to form a pilot hole in the central body 14; and 2) the guide insert 78 is subsequently used to mill out a trigger slot in the central body 14. In this regard, the guide insert 78 includes a main body 80 including a pilot forming aperture 82 and a trigger slot forming aperture 84. The main body 80 defines an outer periphery complimentary in shape to a portion of the template aperture 54. The pilot forming aperture 82 extends within the main body 80 generally parallel to the trigger slot forming aperture 84.

The guide insert 78 additionally includes a pair of connector tabs 86 disposed on opposed sides of the main body 80, with each connector tab 86 being complementary in shape to the template cavity 55. Accordingly, the main body 80 of the guide insert 78 can be received within the template aperture 54, and one connector tab 86 is received within the template cavity 55 connected to the template plate 28 via alignment of apertures formed in at least one connector tab 86 and the template plate 28.

When the guide insert 78 is connected to the template plate 28 to drill the pilot hole in the central body 14, the guide insert 78 assumes the configuration shown in FIG. 6. In particular, the guide insert 78 is arranged such that the pilot forming aperture 82 is positioned farther into the template aperture 54 than the trigger slot forming aperture 84, relative to the template cavity 55. According to one embodiment, the pilot hole drilled in the central body 14 is a 21/64" pilot hole, with the pilot hole being drilled through the entirety of the central body 14 along the drilling axis 88.

Once the pilot hole is drilled, a router is used to form a pocket 85 in the central body 14. The pocket formed in the central body 14 is commonly referred to as a FCG pocket or Fire Control Group pocket. Referring now to FIGS. 7-9, the machining tool assembly 10 is shown in a third configuration, and includes a router plate 90 attachable to the router (not shown) and slidable over the template plate 28 when routing the pocket 85. The router plate 90 includes a generally planar upper surface 92, an opposing generally planar lower surface 94, and a plurality of apertures 96 extending between the upper and lower surfaces 92, 94 for facilitating mounting of the router plate 90 to the router. The router plate 90 additionally includes an upper cavity 98 extending from the upper surface 92 toward the lower surface 94, and terminating at an intermediate shelf 100, with the upper cavity 98 being configured to receive a portion of the router. The router plate 90 further includes a lower cavity 102 extending from the lower surface 94 toward the upper surface 92 and also terminating at the intermediate shelf 100.

The lower cavity 102 is adapted to receive an interchangeable router bushing 104 including a bearing 106 and a main body 108 having a bushing collar 110 disposed about a bushing axis 112 and is adapted to receive a router bit along the bushing axis 112. The bushing collar 110 is insertable within the template aperture 54 during the routing operation, and is operative to prevent the router bit from touching the template plate 28. In this regard, the bushing collar 110 may interface with the template plate 28, rather than the router bit, to prevent inadvertent routing of the template plate 28.

The router bushing 104 is attached to the router plate 90 via a pair of mechanical fasteners 114, which allow for selective interchanging of the router bushing 104 from the router plate 90. When forming the FCG pocket 85, bushing 110 may be used to route the final configuration of the FCG pocket 85. Alternatively, a larger router bushing, i.e., one having a larger diameter collar 110, may be used for milling the central body 14, resulting in an undersized FCG pocket. Next, a smaller router bushing, i.e., one having a smaller diameter collar 110, may be used to mill a final pass to enlarge the central body 14 to the proper dimensions.

The FCG pocket 85 may be routed by making a series of passes or cuts into the central body 14 to incrementally increase the depth of the pocket until the depth of the pocket is equal to the depth of the center depth gauge 58b (i.e., the shortest depth gauge) located on the template plate 28. The depth of each cut or pass may be associated with the hash marks or other indicia located in the depth gauges 58 formed on the template plate 28. Once the depth of the FCG pocket 85 is equal to the center depth gauge 58b, a blocking instrument is used to block off the rear portion of the FCG pocket 85 from further routing. In the exemplary embodiment, the blocking instrument includes the long lock pin 72, which is inserted through the side plates 28 to block off the rear portion of the FCG pocket 85 from further routing. However, it is also contemplated that the blocking instrument may include a pin which is advanced through an aperture formed in the template plate 28 along an axis transverse to the template aperture to block off the rear portion of the FCG pocket 85. The remainder of the FCG pocket 85 is then milled, incrementally, until the depth of the FCG pocket 85 is equal to the depth of the left-most gauge 58a, which is longer than the center depth gauge 58b.

Figure 10:
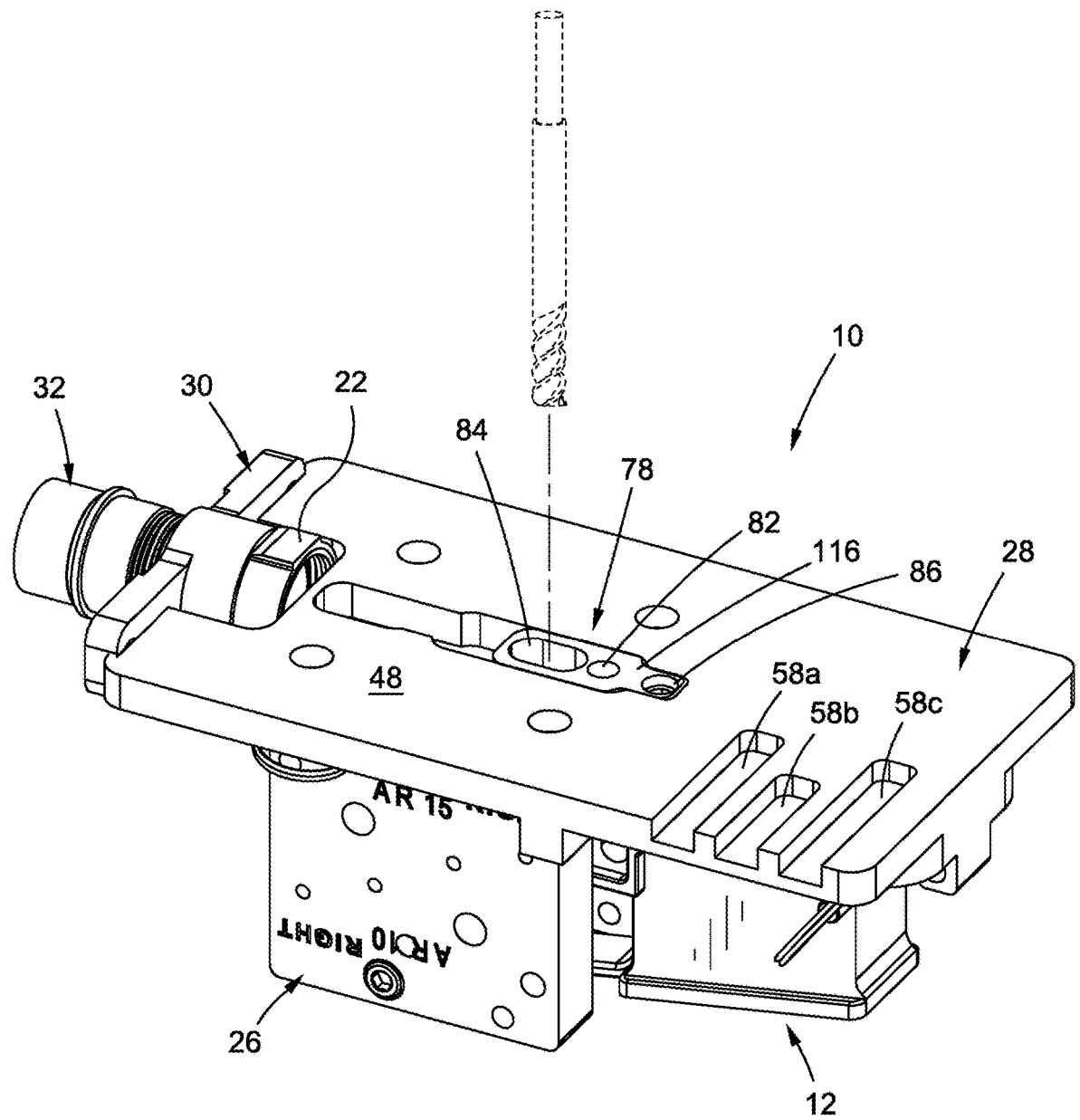
FIG. 10 is an upper perspective view of the machining tool assembly in a fourth configuration.

Referring now to FIG. 10, the router plate 90 is removed from the template plate 28, and the guide insert 78 is again employed to form the trigger slot in the blank 12 at the bottom of the FCG pocket 85. In this regard, the guide insert 78 is placed within the template aperture 54 in a different configuration from that previously used to form the pilot hole. In particular, the guide insert 78 is flipped from its previous configuration, such that the trigger slot forming aperture 84 is positioned toward the buffer tube 22, and the pilot forming aperture 82 is positioned away from the buffer tube 22. Furthermore, with the FCG pocket 85 formed from the previous routing process, the guide insert 78 is at least partially received therein, such that the outer surface 116 of the guide insert 78 is generally flush with the upper surface 48 of the template plate 28.

With the guide insert 78 in place, the trigger slot 115 is milled or routed, incrementally using hash marks found in the right-most gauge, 58c until the slot extends completely through the central body 14.

Figure 11:
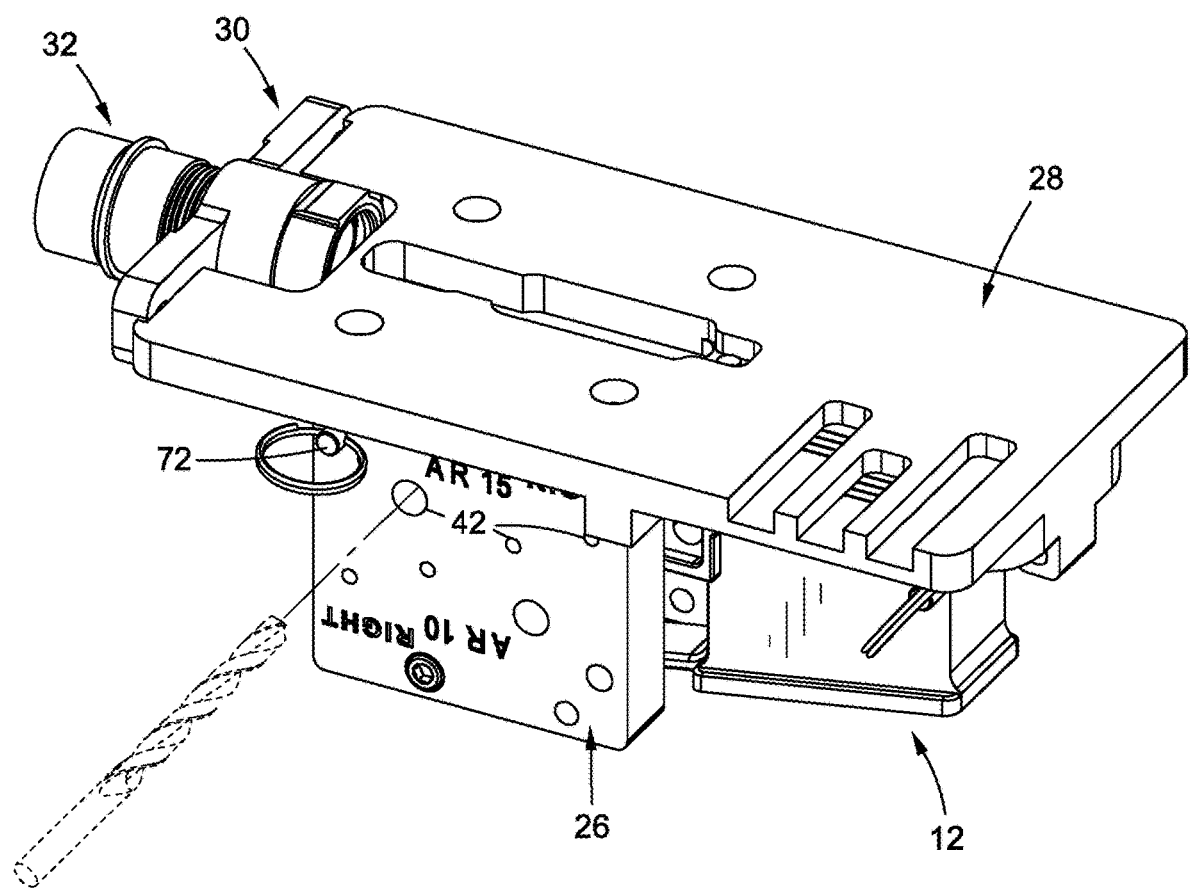
FIG. 11 is an upper perspective view of the machining tool assembly with the drill bit aligned with an aperture in a side plate.

Referring now to FIG. 11, the lock pin 72 previously inserted in the rear is removed, and is installed through the rear takedown apertures. The safety selector holes 118 and trigger pin holes 120 are then drilled using the apertures 42 formed in the side plates 26. In particular, the apertures 42 located in the upper region of the side plates 26 provide the drilling template needed to form the safety selector holes 118 and the trigger pin holes 120. The side plates 26 are formed with apertures 42 associated with two different firearms. Thus, the same side plates 26 may be used to form lower receivers for two different firearms having different dimensions. To switch the side plates 26 for drilling the holes 118, 120 from one firearm to another firearm, the side plates 26 are simply rotated 180 degrees relative to the template plate 28, either about axis 45 or axis 47. Furthermore, the centering mechanism 30 may also be configured to require 180 degree transition from one orientation to the next. In particular, 180 degree rotation of the centering mechanism 30 may accommodate different alignment heights of the corresponding buffer tubes. In an alternative embodiment, the centering mechanism 30 could attach through slotted bores, where when secured with a bolt positioned at the bottom of the slot, it would fit an AR-15 lower receiver, and when the centering mechanism 30 is slid up and secured to the top of the slot, the centering mechanism 30 would fit a .308/AR-10 lower receiver. As such, the user is not required to have a separate jig or assembly for machining two different lower receivers. Rather, the same assembly 10 can be used by simply changing the orientation of the side plates 26 and centering mechanism 30 relative to the template plate 28.

Figure 14:
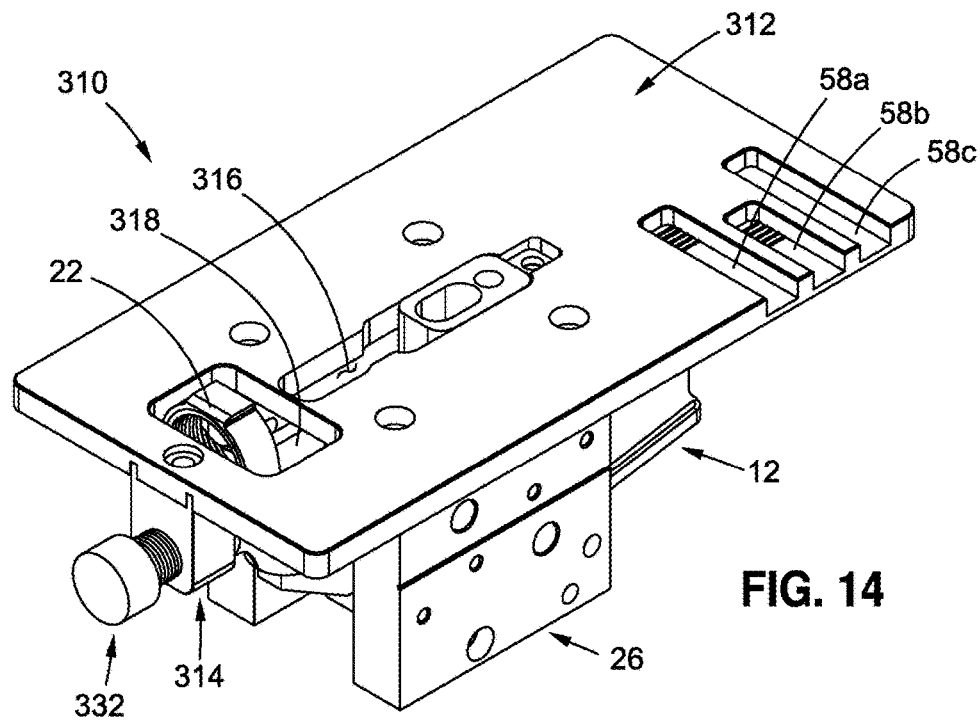
FIG. 14 is an upper perspective view of a second embodiment of a machining tool assembly.
Figure 15:
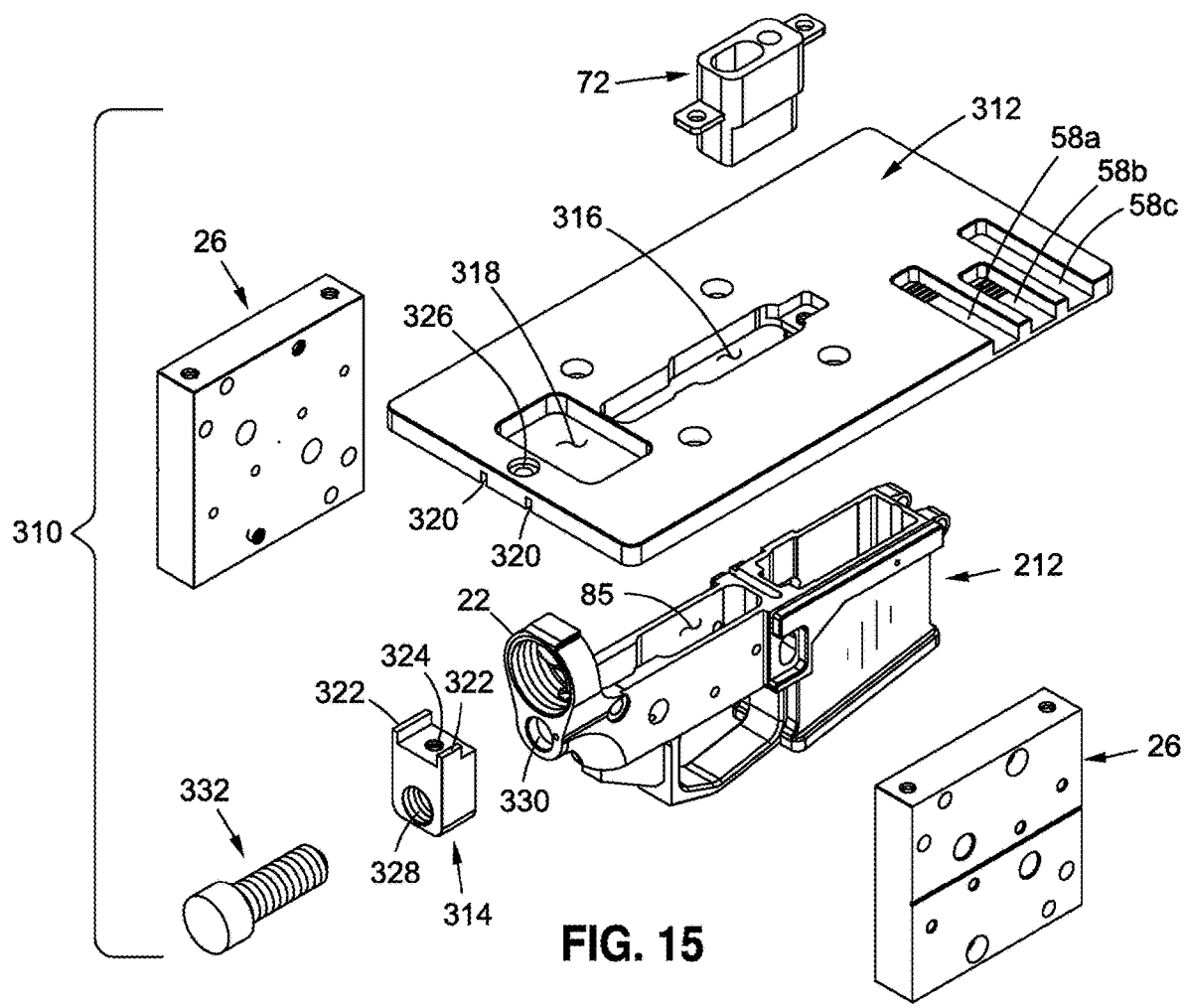
FIG. 15 is an exploded upper perspective view of the machining tool assembly depicted in FIG. 14.

Referring now to FIGS. 14 and 15, there is depicted another embodiment of the machining tool assembly 310, wherein the primary distinction relates to the centering mechanism used for attaching and aligning the blank to the template plate. Accordingly, the following discussion will focus on those features which differ from the embodiment discussed above, while the foregoing discussion can be referred to for a description of those features that are in common.

The machining tool assembly 310 generally includes a template plate 312, a pair of side plates 26, and a centering mechanism 314. The template plate 312 includes a template aperture 316 and a separate buffer tube aperture 318, both of which are at least partially spaced from the outer periphery of the template plate 312. The template aperture 316 provides the template for machining the FCG pocket 85, while the buffer tube aperture 318 provides a space through which at least a portion of the buffer tube 22 may extend when the blank 12 is attached to the assembly 310.

The template plate 312 includes a pair of grooves 320 extending from the lower surface toward the upper surface, with the grooves 320 being sized to receive corresponding tabs 322 formed on the centering mechanism 314. It is contemplated that the grooves 320 may be replaced with a locating pin or any other means to prevent the centering mechanism 314 from rotating. The centering mechanism 314 includes a bore 324 which is aligned with a corresponding bore 326 formed in the template plate 312 for connecting the centering mechanism 314 to the template plate 312. In this regard, the bores 324, 326 on the centering mechanism 314 and the template plate 312 are aligned and are positioned about an axis that is generally perpendicular to the upper surface of the template plate 312. The centering mechanism 314 additionally includes a primary opening 328, which includes an internally threaded surface. The primary opening 328 is generally perpendicular to the bore 324 which is used to connect the centering mechanism 314 to the template plate 312. When the centering mechanism 314 is connected to the template plate 312, the primary opening 328 is aligned with a recess 330, bore, or other void on the blank 12. As shown in the exemplary embodiment, the blank 12 includes a recess 330 extending into the blank 12 just below the buffer tube 22. It is this recess 330 that is aligned with the primary opening 328 of the centering mechanism 314.

A centering screw 332 is advanceable through the primary opening 328 of the centering mechanism 314 and is received within the recess 330 formed on the blank 12 to properly position and align the blank 12 relative to the template plate 312.

With the blank 12 properly positioned relative to the template plate 312, the FCG pocket 85 can be formed in the blank 12, and the safety selector holes 118 and trigger pin holes 120 can be drilled into the blank 12 using the components and methodology described above.

By replacing centering mechanism 314 with one having an aperture of a different height, and rotating side plates 26, the jig/assembly can be used to mill a blank 12 of a different caliber or size, without the need to purchase a different jig/assembly or side plates.

The particulars shown herein are by way of example only for purposes of illustrative discussion, and are not presented in the cause of providing what is believed to be most useful and readily understood description of the principles and conceptual aspects of the various embodiments of the present disclosure. In this regard, no attempt is made to show any more detail than is necessary for a fundamental understanding of the different features of the various embodiments, the description taken with the drawings making apparent to those skilled in the art how these may be implemented in practice.

What is claimed is:

1. A jig assembly for machining portions of a blank of an unfinished firearm lower receiver, the blank having a buffer tube and a rear takedown aperture, the jig assembly comprising:
   a template plate having a machining aperture and a pin aperture, the pin aperture configured to couple the blank with the template plate by the rear takedown aperture;
   a centering mechanism configured to removably attach to the template plate, the centering mechanism including an opening configured to align with a void on the blank;
   at least one side plate extending from the template plate, the at least one side plate configured to support the template plate and the blank on a surface and including alignment features;
   wherein an alignment insert is configured to be insertable through the opening in the centering mechanism and the void in the blank to couple the blank with the template plate;
   wherein the machining aperture aligns with a top surface of the blank when the blank is coupled with the template plate by the centering mechanism and the pin aperture.

2. The jig assembly of claim 1, wherein the alignment insert is a buffer screw and the void is the buffer tube, the buffer screw have external threads corresponding to internal threads of the buffer tube.

3. The jig assembly of claim 1, wherein the alignment insert is a centering screw and the void is a recess below the buffer tube.

4. The jig assembly of claim 3, wherein the centering screw has external threads and the opening of the centering mechanism has corresponding internal threads.

5. The jig assembly of claim 1, wherein the at least one side plate is a pair of side plates, the side plates disposed on opposite sides of the machining aperture.

6. The jig assembly of claim 1, wherein the centering mechanism is reversible to accommodate differently sized blanks.

7. The jig assembly of claim 1, wherein the template plate includes a recess defined by a side wall extending into the template plate from an aft end of the template plate towards the aperture, the recess being configured to receive the buffer tube.

8. The jig assembly of claim 7, wherein the centering mechanism encloses an open end of the recess when coupled with template plate.

9. A jig assembly for machining portions of a blank of an unfinished firearm lower receiver, the blank having a buffer tube and a rear takedown aperture, the jig assembly comprising:
   a template plate having an upper side and a lower side and first and second ends; a machining aperture disposed between the first and second ends of the template plate, the machining aperture extending from the upper side to the lower side;

a first forwardly positioned aperture at the first end of the template plate and a second forwardly positioned aperture at the first end of the template plate;

a centering mechanism at the second end of the template plate configured to removably couple with the blank;

at least one side plate extending from the template plate, the at least one side plate configured to support the template plate and the blank on a surface and including alignment features;

wherein the machining aperture aligns with a top surface of the blank when the blank is coupled with the template plate by the centering mechanism and the rear takedown aperture is coupled with either the first or second forwardly positioned apertures.

10. The jig assembly of claim 9, wherein the first and second forwardly positioned apertures extend from the lower side of the template plate.

11. The jig assembly of claim 9, wherein the first forwardly positioned aperture is spaced farther from the machining aperture than the second forwardly positioned aperture.

12. The jig assembly of claim 9, wherein the first forwardly positioned aperture is configured for use with an AR-15 blank and the second forwardly positioned aperture is configured for use with an AR-10/.308 blank.

13. The jig assembly of claim 9, wherein the first and second forwardly positioned apertures extend from a front support platform.

14. The jig assembly of claim 9, wherein each of the first and second forwardly positioned apertures are configured to receive a pin.

15. A jig assembly for machining portions of a blank of an unfinished firearm lower receiver, the blank having a buffer tube and a rear takedown aperture, the jig assembly comprising:

a template plate having an upper side and a lower side and first and second ends; a machining aperture disposed between the first and second ends of the template plate, the machining aperture extending from the upper side to the lower side;

a pin aperture at the first end of the template plate and a centering mechanism at the second end of the template plate configured to removably couple with the blank; a support bar extending from the lower surface of the template plate; at least one side plate extending from the template plate, the at least one side plate configured to support the template plate and the blank on a surface and including alignment features;

wherein the support bar engages with a top surface of the blank when the blank is coupled with the template plate by the centering mechanism and the pin aperture.

16. The jig assembly of claim 15, wherein the support bar aligns the top surface of the blank with the upper side of the template plate.

17. The jig assembly of claim 15, wherein the at least one side plate is a pair of side plates, the side plates disposed on opposite sides of the machining aperture.

18. The jig assembly of claim 17, wherein support bar abuts the side plates to facilitate alignment of the side plates relative to the template plate.

19. The jig assembly of claim 15, wherein the support bar is formed integrally with the template plate.

20. The jig assembly of claim 1, wherein the alignment features include a set of drill apertures configured to align a drill with the blank.

* * * * *